United States Patent [19]

Hemery

[11] 4,335,068
[45] Jun. 15, 1982

[54] METHOD OF MOULDING CONTAINERS FROM AT LEAST TWO DIFFERENT PLASTIC MATERIALS, MACHINE FOR CARRYING OUT THIS METHOD AND CONTAINERS OBTAINED THEREBY

[75] Inventor: André Hemery, Les Andelys, France

[73] Assignee: Allibert Exploitation, France

[21] Appl. No.: 970,181

[22] Filed: Dec. 18, 1978

[30] Foreign Application Priority Data

Dec. 23, 1977 [FR] France ................ 77 39069

[51] Int. Cl.³ .................... B29F 1/06; B29F 1/12
[52] U.S. Cl. .................... 264/245; 264/250;
264/255; 264/328.1; 264/328.4; 264/328.7;
264/328.8; 425/130; 425/135; 425/145;
425/149; 425/542; 425/586; 425/256
[58] Field of Search ............ 264/250, 255, 245, 328,
264/246, 242, 328.1, 328.13, 328.4, 328.7, 328.8,
40.1, 40.4; 425/130, 127, 129 R, 588, 132, 120,
135, 144, 145, 146, 149, 256, 542, 586, 544

[56] References Cited

U.S. PATENT DOCUMENTS

| 2,337,550 | 12/1943 | Crosby | 425/130 |
|---|---|---|---|
| 2,744,043 | 5/1956 | Ramberg | 156/173 |
| 2,814,330 | 11/1957 | Vanzo et al. | 156/414 |
| 2,837,456 | 6/1958 | Parilla | 156/173 |
| 2,848,133 | 8/1958 | Ramberg | 156/173 |
| 3,028,284 | 4/1962 | Reeves | 264/328 |
| 3,051,994 | 9/1962 | Carozzo | 264/328 |
| 3,089,199 | 5/1963 | Halacsy | 264/328 |
| 3,221,373 | 12/1965 | Kwan | 264/245 |
| 3,462,175 | 8/1969 | Johnson | 285/113 |
| 3,822,107 | 7/1974 | Wogerer | 425/130 |
| 3,859,016 | 1/1975 | McGee et al. | 425/130 |
| 3,917,789 | 11/1975 | Heisler | 264/242 |
| 4,160,309 | 7/1979 | Scholle | 425/130 |

FOREIGN PATENT DOCUMENTS

| 2110156 | 9/1972 | Fed. Rep. of Germany . | |
| 2802237 | 7/1978 | Fed. Rep. of Germany | 425/130 |
| 1234310 | 10/1960 | France . | |
| 1262652 | 4/1961 | France . | |
| 1503998 | 10/1967 | France . | |

Primary Examiner—Willard E. Hoag
Attorney, Agent, or Firm—Steinberg & Raskin

[57] ABSTRACT

A method of moulding containers consisting of two plastic materials compatible with and sealable to each other, of differing nature and/or color, wherein the material is injected into a space provided between the walls of a mould and a counter-mould, and comprising defining within said space by means of removable separators a first and a second sub-space; injecting into said first sub-space a first one of said materials to fill it fully, injecting into the second sub-space the second material, removing said separators and continuing the injection under pressure of said second material until local interpenetration thereof.

6 Claims, 6 Drawing Figures

U.S. Patent  Jun. 15, 1982  4,335,068
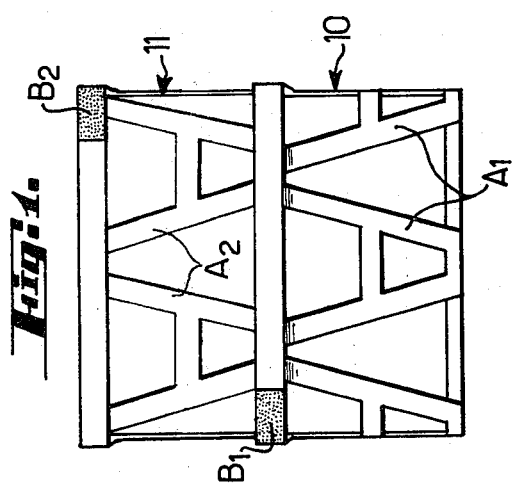
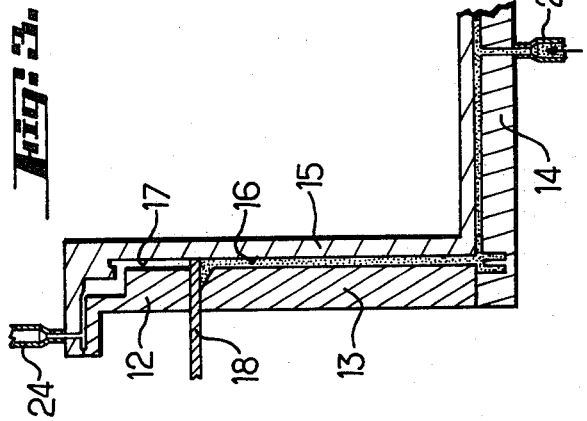
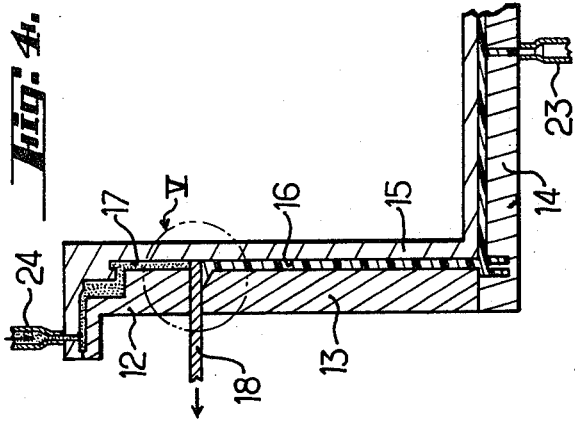
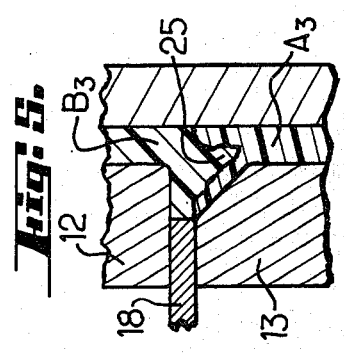
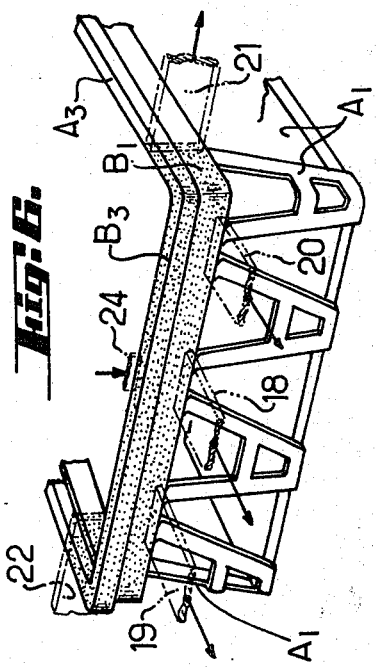
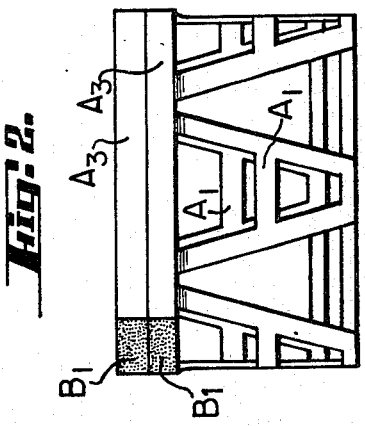

METHOD OF MOULDING CONTAINERS FROM AT LEAST TWO DIFFERENT PLASTIC MATERIALS, MACHINE FOR CARRYING OUT THIS METHOD AND CONTAINERS OBTAINED THEREBY

The present invention relates essentially to a method of moulding containers or like vessels or other objects from plastic material consisting of at least two compatible and sealable or fusable plastic materials of differing nature and/or colours. The invention is also directed to an improved machine or apparatus for carrying out this method as well as to the novel containers obtained thereby.

It is sometimes generally interesting to make a moulded container from plastic material so that at least one of its component parts be moulded in a material different from that which constitutes the remaining portion of the container.

This may be interesting in terms for instance of orientation of the container or also when a given wall of a container has to undergo stresses or strains differing from those prevailing in the remaining portion of a container.

With respect to the problems of orientation it is of course possible by using two plastic materials of differing colours to provide a conspicuous marking of the orientation. Such a marking provided within the mass or body of the container is of course much preferred to a marking added for instance by sticking, gluing or adhesively bonding a visible strip which may be torn away or damaged.

If a different resistance to stresses in such walls with respect to others is involved, the approach consisting in the use for each wall of the most suitable materials is obviously preferable. This may be the case for instance of a container the bottom of which will have to undergo mechanical, thermal, chemical or other stresses and strains differing from those which the side walls of the same container have to sustain.

The method according to the invention makes use of the known general technical process according to which the component material of the container is injected into an injection space or gap provided between the wall of a mould and the wall of a counter-mould. The injected plastic materials should of course be compatible chemically and be able to be properly sealed, welded or fused to each other. This however is not sufficient for providing a good cohesion at the junction of both moulded parts made from differing plastic materials, respectively.

According to the invention the following operating steps are performed in the stated sequence with the view to obtaining the desired cohesiveness:

a—defining within the said space by means of separating members, such as for instance removable partition walls, at least one first sub-space and one second sub-space, b—injecting into said first sub-space a first one of said two materials until filling it substantially completely, c—injecting into the second sub-space a second one of said two materials, d—taking off said separating members for instance by removing said partition walls, e—continuing the injection under pressure of said second material so as to achieve a local interpenetration of said second material within said first material in the junction or meeting zone of said sub-spaces.

According to further advantageous characterizing features of the invention the first injection of said first material is carried out with a computed volume substantially equal to that of the first sub-space and the second injection of said second material is effected under a determined pressure and with a greater volume than that of said second sub-space.

According to a significant characterizing feature of the invention the method used comprises the step of selecting as the junction zone between said first and second sub-spaces a place where the thickness of the object is relatively great and preferably higher than 2 mm or 3 mm, so as to achieve an interpenetration of the second material within the midst or core of the first one as affecting a junction region with a relatively large surface area and formed with asperities likely to promote through sealing, fusing or welding and interlocking an outstanding cohesiveness of the junction.

The invention is also directed to a machine, apparatus, device or like appliance for moulding containers or other objects from plastic material consisting of at least two compatible and sealable plastic materials of differing nature and/or colours, the machine comprising an injection space provided between the wall of a mould and the wall of a counter-mould and being characterized in that it includes retractable or removable partitions or like wall members separating or dividing said space into at least a first sub-space and a second sub-space, and separate means for injecting each one of said materials communicating the one with said first sub-space and the other with said second sub-space.

The invention aims also by way of new industrial products at covering the objects or like articles of manufacture and in particular the containers, vessels, tanks, vats, jars and like boxes made with the method according to the invention and/or by means of a machine according to the invention, these objects being characterized in that they comprise two parts made from plastic materials of differing nature and/or colours which are interconnected at their junction or meeting zone by having a significant interpenetration of one of said two materials in depth into the other thereby providing for the strength of the junction or connection.

The invention and the process of putting same into use or practice will be better understood and further objects, characterizing features, details and advantages thereof will appear more clearly from the following description with reference to the accompanying diagrammatic drawings given by way of non limiting example only illustrating a presently preferred specific embodiment of the invention. In these drawings:

FIG. 1 shows an outside view of two containers, vessels or jars manufactured according to the teachings of the invention and arranged to one above the other;

FIG. 2 shows the same two jars nested or fitted into each other after turning over or reversal through 180° of the upper jar with respect to the position it assumes on FIG. 1;

FIG. 3 illustrates on a larger scale and in cross section with parts broken away a machine designed according to the invention and comprising a mould and a counter-mould for the moulding of a container consisting of two plastic materials of differing nature, the machine being shown in a first injection stage;

FIG. 4 is a view similar to that of FIG. 3 but illustrating a second injection stage;

FIG. 5 illustrates on a larger scale the details surrounded by a circle V on FIG. 4 to show how the interpenetration is performed within the junction zone between both plastic materials used; and FIG. 6 is a perspective view with parts broken away showing the container after the moulding operation and the place relative to that container where were applied the retractable or removable partition walls separating or dividing the moulding space into a pair of sub-spaces as partially illustrated in FIGS. 3 to 5.

Referring at first to FIGS. 1 and 2 there are illustrated two containers 10, 11 placed the one above the other on FIG. 1 and nested or fitted into each other on FIG. 2. Such containers are known which are designed in such a manner that in one orientation thereof they may be "stacked" the ones above the others in overlying relationship, the bottom of the upper container engaging in bearing relationship the top edge or rim of the lower container whereas in another relative orientation for instance turned upside down or reversed through 180° the containers would nest or fit into each other. This obviously is advantageous for carrying, transporting or conveying the containers in their empty condition which in view of their being nested or fitted into each other require little room as well as for stacking the loaded or full containers without any danger of damaging through crushing the goods or products which are contained therein.

In order to allow the immediate location of the desired orientation of the jar or container it is advantageous to provide means for marking the orientation or relative position.

Thus according to the examplary embodiment illustrated each jar is separated or divided into two parts marked the one A and the other B. In the example shown the part B is but a small portion of the top edge or rim of each container. The user thus knows forthwith that if he arranges the parts B in corresponding, mating or registering relationship as shown in FIG. 2, the jars would nest or fit into each other whereas if he arranges them in opposing relationship as shown in FIG. 1 the jars would be stacked.

For the sake of durability and convenience it is of course desirable that the distinct parts A and B be made or cast integral or in one piece with the jar while being easily discernible for instance by having differing colours. This would require the jar to be moulded by means of two separate injection steps and to exhibit a good sealed, fused or welded connection at the junction of both materials used.

As previously stated herein the problem of making a container from two different plastic materials may also be encountered in other cases for instance when a wall such as the bottom wall of the container has to be made from another material than its side walls.

The method of manufacture illustrated in FIGS. 3 to 6 enables this problem of providing a good junction between both container parts to be solved.

Referring now to FIG. 3 there is shown a mould three portions of which are designated by the references numeral 12, 13, 14, respectively, and co-operate with a counter-mould 15 so as to form the moulding space or gap therebetween in which the object or article to be made will be moulded or cast.

According to the invention this moulding space or gap is divided into two sub-spaces 16, 17, respectively, which are defined by retractable partition walls such as 18.

On FIG. 6 is better seen in a perspective view the portion B3 of a container moulded within the sub-space 17 as well as the places where are provided the retractable separating members 18, 19, 20, 21, 22 within the mould so as to separate the sub-space 17 from the sub-space 16 in which the remaining portion of the container A3 is moulded or cast.

According to the invention with the retractable partition walls 18 to 22 being positioned so as to separate the sub-spaces 16, 17 from each other the process consists in at first injecting at 23 as shown in FIG. 3 the plastic material which has to fill the sub-space 16 so as to form the portion A3 of the container. This injection is made with a determined volume corresponding to the amount of material just required for that injection.

Once this injection has been carried out i.e. as soon as the sub-space 16 is filled up with the plastic material involved the method consists in injecting at 24 as shown in FIG. 4 the second plastic material which has to fill up the sub-space 17 so as to form the portion B3 of the container. This injection is performed under pressure. When the material injected into the sub-space 17 engages the movable partition walls 18 to 22 and this may be sensed or detected for instance through an increase in the injection pressure at the injector device the movable partition walls are quickly retracted or removed as shown in FIG. 5 so as to allow the material injected under pressure at 24 to fill the space disengaged by the retracted partition walls and to contact the material already cast within the space or gap 16.

With second injection having been done under pressure the plastic material injected in second place and forming the portion B3 would interpenetrate the plastic material injected in the first place and forming the portion A3 of the container. Thus on FIG. 5 there is clearly seen the projection 25 of the second plastic material into the first one.

It should moreover be pointed out that in the junction zone between both materials care has been taken to provide at that place a relatively great thickness which should advantageously be above 2 mm or 3 mm. Owing to this the plastic material forming the portion A3 is still in a fluid condition in the junction zone when retracting the removable partition walls thereby facilitating the interpenetration of the second plastic material into the first one. Moreover this fluidity is greater within the midst or core of the material than towards the walls of a mould thereby achieving a good seal, weld or fused connection and a good interlocking in depth of both plastic materials while retaining a relatively clean separation between both materials A3, B3 outside.

When the manufacture of jars which may be stacked and nested as those of the kind shown in FIGS. 1 and 2 is aimed at the same plastic material should advantageously be used for carrying out both injections but different pigments or colouring or dyeing matters should be used for both parts A and B, respectively, of the containers.

It should be understood that the invention is not at all limited to the embodiment shown and described herein which has been given by way of example only the invention comprising all the technical equivalents of the means described as well as their combinations if same are carried out according to its gist and used within the scope of the appended claims. Thus for instance the retracting of the movable partition walls may be simply synchronized in phase-locked or follow-up relationship with the end of the injection effected within the larger mould cavity. Also the method according to the invention may be used when more than two colours have to be injected or when there should be provided more than two component parts of differing constitutions sealed, welded, fused or adhesively bonded to each other. In such a case there should be provided as many sub-spaces as needed separated by retractable partition walls and said partition walls should be removed as the separate injections of said component parts are carried out.

What is claimed is:

1. A method of moulding hollow objects such as containers from plastic material consisting of at least two compatible plastic materials which are sealable to each other and which differ in either of their nature and their colour, said method including the steps of providing a mould and a counter-mould, as well as arranging them so as to leave an injection space between the wall of said mould and the wall of said counter-mould and injecting said component material of said article of manufacture into said injection space, wherein the improvement comprises the following operating steps:

a—defining within said space through separating means at least one first sub-space and one second sub-space which are contiguous to each other at a junction zone in the region of said separating means;
   b—injecting into said first sub-space a first one of said two materials in a predetermined volume computed to be just that required to fill said first sub-space substantially;
   c—injecting into said second sub-space a second one of said two materials;
   d—removing said separating means while said first material is still fluid in said junction zone; and
   e—continuing injection of said second material under a predetermined pressure such that the total volume of said second material injected is larger than that of said second sub-space so as to achieve a local interpenetration of said second material into said first material within said junction zone between said spaces.

2. A method according to claim 1, comprising the step of providing retractable partition walls to form said separating means.

3. A method according to claim 1, comprising the steps of providing said first and said second sub-spaces with unequal volumes and selecting said first sub-space to be larger than said second sub-space.

4. A method according to claim 1, comprising selecting for the junction zone between said first and said second sub-spaces a place where the thickness of said object is relatively great.

5. A method according to claim 4 wherein said relatively great thickness is greater than about 2 mm.

6. A machine for moulding articles from plastic materials consisting of at least two compatible plastic materials sealable to each other and differing in either of their nature and their colour, said machine comprising a mould and a countermould with an injection space defined therebetween, at least one retractable partition wall separating said space in the region of a junction zone into at least one first sub-space and one second sub-space and which is adapted to be retracted from said space after injection of the first material and while the first material is still fluid in the region of said junction zone, and separate means for injecting each one of said materials, communicating the one with said first sub-space and the other with said second sub-space said injecting means communicating with said first sub-space including means for injecting a predetermined volume of said first material which is computed to be just that required to fill said first sub-space, and said injection means communicating with said second sub-space including means for injecting said second material at a predetermined pressure such that the total volume of said second material injected is larger than that of said second predetermined pressure such that the total volume of said second material injected is larger than that of said second sub-space.

* * * * *